United States Patent
Huh et al.

(10) Patent No.: US 11,208,106 B2
(45) Date of Patent: Dec. 28, 2021

(54) METHOD FOR INERTIA DRIVE CONTROL WITH TORQUE SHARING OF ECO-FRIENDLY VEHICLE

(71) Applicants: HYUNDAI MOTOR COMPANY, Seoul (KR); KIA MOTORS CORPORATION, Seoul (KR)

(72) Inventors: Jee-Wook Huh, Gwangmyeong-si (KR); Teh-Hwan Cho, Anseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 277 days.

(21) Appl. No.: 16/376,459

(22) Filed: Apr. 5, 2019

(65) Prior Publication Data

US 2019/0359213 A1  Nov. 28, 2019

(30) Foreign Application Priority Data

May 23, 2018  (KR) .......................... 10-2018-0058483

(51) Int. Cl.
*B60W 30/18* (2012.01)
*B60W 20/14* (2016.01)
(Continued)

(52) U.S. Cl.
CPC ...... *B60W 30/18127* (2013.01); *B60W 10/08* (2013.01); *B60W 10/188* (2013.01);
(Continued)

(58) Field of Classification Search
CPC .............. B60W 30/00; B60W 30/18; B60W 30/18009; B60W 30/18109; B60W 30/18127; B60W 30/18136; B60W 10/00; B60W 10/04; B60W 10/08; B60W 10/18; B60W 10/184; B60W 10/188;
(Continued)

(56) References Cited

U.S. PATENT DOCUMENTS 6,364,434 B1 *  4/2002  Sway-Tin .............. B60W 10/18
                                                        303/152
2005/0189894 A1 *  9/2005  Komiyama ........... B60L 15/025
                                                        318/376
(Continued)

FOREIGN PATENT DOCUMENTS

JP          2016-215934 A      12/2016

*Primary Examiner* — Geepy Pe
*Assistant Examiner* — Michael Allen Brace, Jr.
(74) *Attorney, Agent, or Firm* — Morgan, Lewis & Bockius LLP

(57) ABSTRACT

A method for inertia drive control with torque sharing of an eco-friendly vehicle includes when an event in which the eco-friendly vehicle being decelerated with the inertia drive control is detected; calculating, by a controller, a distance variable and a speed variable according to the event; calculating, by the controller, a deceleration torque, which is required for an inertia drive of the eco-friendly vehicle, by dividing into a motor torque and a hydraulic braking torque; and performing, by the controller, inertia drive cooperative control in which the deceleration is performed without driver intervention with motor control through the motor torque and hydraulic braking control through hydraulic braking torque.

17 Claims, 5 Drawing Sheets

(51) Int. Cl.
  *B60W 10/188*   (2012.01)
  *B60W 10/08*   (2006.01)
(52) U.S. Cl.
  CPC ......... *B60W 20/14* (2016.01); *B60W 2520/10* (2013.01); *B60W 2520/28* (2013.01); *B60W 2540/12* (2013.01); *B60W 2556/60* (2020.02); *B60Y 2200/92* (2013.01)
(58) Field of Classification Search
  CPC ...... B60W 20/00; B60W 20/10; B60W 20/13; B60W 20/14; B60W 2520/00; B60W 2520/10; B60W 2520/28; B60W 2540/00; B60W 2540/12; B60W 2556/00; B60W 2556/45; B60W 2556/60; B60Y 2200/00; B60Y 2200/90; B60Y 2200/92
  See application file for complete search history.

(56) References Cited

U.S. PATENT DOCUMENTS

| | | | | |
|---|---|---|---|---|
| 2005/0200197 A1* | 9/2005 | Crombez | ............ | B60W 10/188 303/152 |
| 2005/0269875 A1* | 12/2005 | Maki | ............... | B60L 50/16 303/152 |
| 2008/0100129 A1* | 5/2008 | Lubbers | ............... | B60L 7/18 303/113.1 |
| 2011/0071716 A1* | 3/2011 | Gray, Jr. | ............... | B60W 10/08 701/22 |
| 2012/0319465 A1* | 12/2012 | Koyama | ............... | B60T 1/10 303/3 |
| 2013/0211685 A1* | 8/2013 | Ullrich | ............... | B60T 8/4872 701/70 |
| 2014/0172211 A1* | 6/2014 | Kim | ............... | B60L 15/2009 701/22 |
| 2014/0200754 A1* | 7/2014 | Gray, Jr. | ............... | B60K 6/46 701/22 |
| 2015/0232099 A1* | 8/2015 | Miller | ............... | B60W 50/14 701/70 |
| 2016/0096434 A1* | 4/2016 | Nakaoka | ............... | B60L 3/108 701/78 |
| 2016/0101780 A1* | 4/2016 | Park | ............... | B60W 50/0097 701/70 |
| 2016/0152143 A1* | 6/2016 | Nakamura | ............... | B60W 10/08 701/22 |
| 2016/0176413 A1* | 6/2016 | Oguri | ............... | B60W 20/14 701/22 |
| 2018/0043896 A1* | 2/2018 | Lee | ............... | B60W 10/06 |
| 2018/0056791 A1* | 3/2018 | Lee | ............... | B60L 7/26 |
| 2018/0334038 A1* | 11/2018 | Zhao | ............... | B60K 6/48 |

\* cited by examiner

METHOD FOR INERTIA DRIVE CONTROL WITH TORQUE SHARING OF ECO-FRIENDLY VEHICLE

CROSS-REFERENCE TO RELATED APPLICATION

This application claims priority to Korean Patent Application No. 10-2018-0058483, filed on May 23, 2018, which is incorporated herein by reference in its entirety.

TECHNICAL FIELD

The present disclosure relates to inertia drive control of an eco-friendly vehicle. More particularly, the present disclosure relates to a method for inertia drive control with a torque sharing, in which inertia drive cooperative control is performed through hydraulic braking in a maximum utilization state of a motor.

BACKGROUND

Recently, more improved fuel efficiency has been pursued in an eco-friendly vehicle employing a motor as a power source through extension of a fuel efficiency improvement control range.

As an example of extension of a fuel efficiency improvement control range, there is a vehicle deceleration situation. The vehicle deceleration situation is caused, during vehicle braking, by deceleration in inertia drive control of a vehicle, in which the vehicle actively performs deceleration control without a manipulation of a brake pedal by a driver, rather than vehicle braking in which regenerative braking control for converting kinetic energy into electrical energy according to manipulation of the brake pedal is implemented.

Therefore, the inertia drive control for improving fuel efficiency through deceleration induces the driver to decelerate the vehicle at a time when a forward deceleration event (e.g., a navigation notification) occurs while the vehicle is driving, and in a subsequent deceleration situation, the inertia drive control decelerate a rotational speed of the motor so as to prevent a waste of energy due to forcible deceleration of the vehicle by the brake pedal, thereby further improving the fuel efficiency. In such a case, the induction of the vehicle deceleration for the driver is implemented by an inertia drive guidance and a guidance function which induce the driver to release a driver's foot from an accelerator pedal at an appropriate point of time.

More specifically, the inertia drive control detects a deceleration event, which is required to decelerate a vehicle while the vehicle is driving, such as an interchange (IC), a junction (JC), an intersection, a speed limit road, a curved road, a traffic light, a U-turn, a left or right turn, a tollgate, a destination, or the like, and the inertia drive control induces the driver to release the driver's foot from the accelerator pedal or the brake pedal at a point of time of deceleration and then controls a motor torque (that is a negative torque) to perform deceleration of the vehicle. Therefore, unlike regenerative braking which is performed through braking force distribution of a frictional braking force by a braking device and a regenerative braking force (electrical braking force) by the motor, the inertia drive control performs the deceleration of the vehicle only by driving resistance and the motor of the vehicle without the friction braking force.

Consequently, motor usability for vehicle deceleration control may be significantly increased while an improvement rate of fuel efficiency of the eco-friendly vehicle may be improved with the inertia drive control in harmony with regenerative braking control, and also motor deceleration control without a driver intervention may have usability suitable for infrastructure technology required for an autonomous vehicle.

However, the above-described inertia drive control is limited to a motor-only control method which uses only a motor without hydraulic braking. Therefore, since the motor-only control method is not able to use a hydraulic pressure having easiness and accuracy, it is difficult to increase reliability of the driver for the inertia drive control, and particularly, a limiting condition for blocking execution of the inertia drive control is required, such that the motor-only control method is inevitably insufficient and unsuitable for an autonomous vehicle without a driver intervention.

SUMMARY

An embodiment of the present disclosure is directed to an eco-friendly vehicle to which a method for inertia drive control with a torque sharing is applied, the method capable of overcoming a limit of inertia drive control in which a motor is used in alone by implementing inertia drive cooperative control with motor deceleration control by a motor torque and hydraulic braking control by a hydraulic braking torque, and particularly, improving usability of an autonomous vehicle without driver intervention while improving reliability of the driver and an effect of fuel efficiency improvement with the inertia drive cooperative control using a hydraulic pressure characteristic having easiness and accuracy in control.

Other objects and advantages of the present disclosure can be understood by the following description and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, a method for inertia drive control with a torque sharing includes: when an event in which an eco-friendly vehicle being decelerated with the inertia drive control is detected, calculating, by a controller, a distance variable and a speed variable according to the event; calculating, by the controller, a deceleration torque, which is required for an inertia drive of the eco-friendly vehicle, by dividing into a motor torque and a hydraulic braking torque; and performing, by the controller, inertia drive cooperative control in which the deceleration is performed without driver intervention with motor control through the motor torque and hydraulic braking control through hydraulic braking torque.

A start position, a conversion position, and a target position, which are applied to the inertia drive control, may be calculated as the distance variable according to an inertia drive target profile of the eco-friendly vehicle. In this case, the start position, the conversion position, and the target position may be set in a time-series manner.

A current vehicle speed, an estimated vehicle speed, and a target vehicle speed, which are applied to the inertia drive control, may be calculated as the speed variable according to the inertia drive target profile of the eco-friendly vehicle. In this case, the current vehicle speed may be a vehicle speed at a point of time when the eco-friendly vehicle passes the start position of the distance variable, the estimated vehicle speed may be a vehicle speed estimated at the conversion position of the distance variable when an inertia drive is performed according to the inertia drive target profile at the start position, and the target vehicle speed may be a vehicle speed at a point of time when the eco-friendly vehicle reaches the target position of the distance variable.

The deceleration torque for the inertia drive control may be determined from deceleration energy of the eco-friendly vehicle, which is generated between application of the inertia drive target profile of the eco-friendly vehicle and non-application thereof, and an entire section of the deceleration energy may be calculated as the deceleration torque after being divided by unit time to be calculated as deceleration power.

The motor torque for the inertia drive cooperative control may be calculated as an actual motor deceleration torque which forms an intersection area by mapping an available motor deceleration torque to the deceleration torque. The actual motor deceleration torque may be a minimum value of the available motor deceleration torque and may maximally utilize a motor. The braking hydraulic pressure for the inertia drive cooperative control may be set to a braking hydraulic pressure in an area outside the intersection area of the deceleration torque which is not able to be managed by the motor torque.

When an inertia drive cooperative control termination condition is detected during the inertia drive cooperative control is performed, the method for inertia drive control with a torque sharing may further include controlling the vehicle driving with the detected inertia drive cooperative control termination condition while interrupting or terminating the inertia drive control.

Before the inertia drive control is terminated due to a target position arrival condition, the inertia drive cooperative control termination condition may be applied when at least one of a wheel lock occurrence, an anti-lock brake system (ABS) operation, and a brake manipulation is satisfied. The wheel lock occurrence and the ABS operation may be classified into an inertia drive critical condition, and the inertia drive cooperative control may be interrupted by control of the wheel lock occurrence or the ABS operation, which is performed by applying a step output of 0 to the motor torque, in the inertia drive critical condition. Meanwhile, the brake manipulation may be classified into an inertia drive subsequent priority release condition, and the inertia drive cooperative control may be interrupted by control of the brake manipulation, which is performed by applying a rate output of a slope to the motor torque, in the inertia drive subsequent priority release condition.

The release condition may involve a brake pedal manipulation of the driver together with the interruption of the inertia drive cooperative control, so that the driving of the eco-friendly vehicle may be controlled with at least one of control when braking is started, control when regenerative braking is limited, and control when braking is off.

The controller may constitute the eco-friendly vehicle by including a hybrid control unit (HCU) in conjunction with a GPS and a battery management system (BMS), and the eco-friendly vehicle may be configured such that a motor control unit (MCU) for controlling the motor and an active hydraulic booster (AHB) for controlling the braking system are in conjunction with the HCU.

The HCU may include a vehicle deceleration energy algorithm for calculating the deceleration energy of the eco-friendly vehicle for the deceleration torque, an available motor deceleration energy algorithm for calculating the motor torque, and a hydraulic braking torque algorithm for calculating the hydraulic braking torque.

The available motor deceleration energy algorithm may include an available motor deceleration energy algorithm for calculating an available motor deceleration torque, a motor deceleration torque algorithm for calculating an intersection area by mapping the available motor deceleration torque with the deceleration torque, and a motor torque algorithm for calculating the motor torque using the intersection area as an actual motor deceleration torque.

DESCRIPTION OF SPECIFIC EMBODIMENTS

Figure 1:
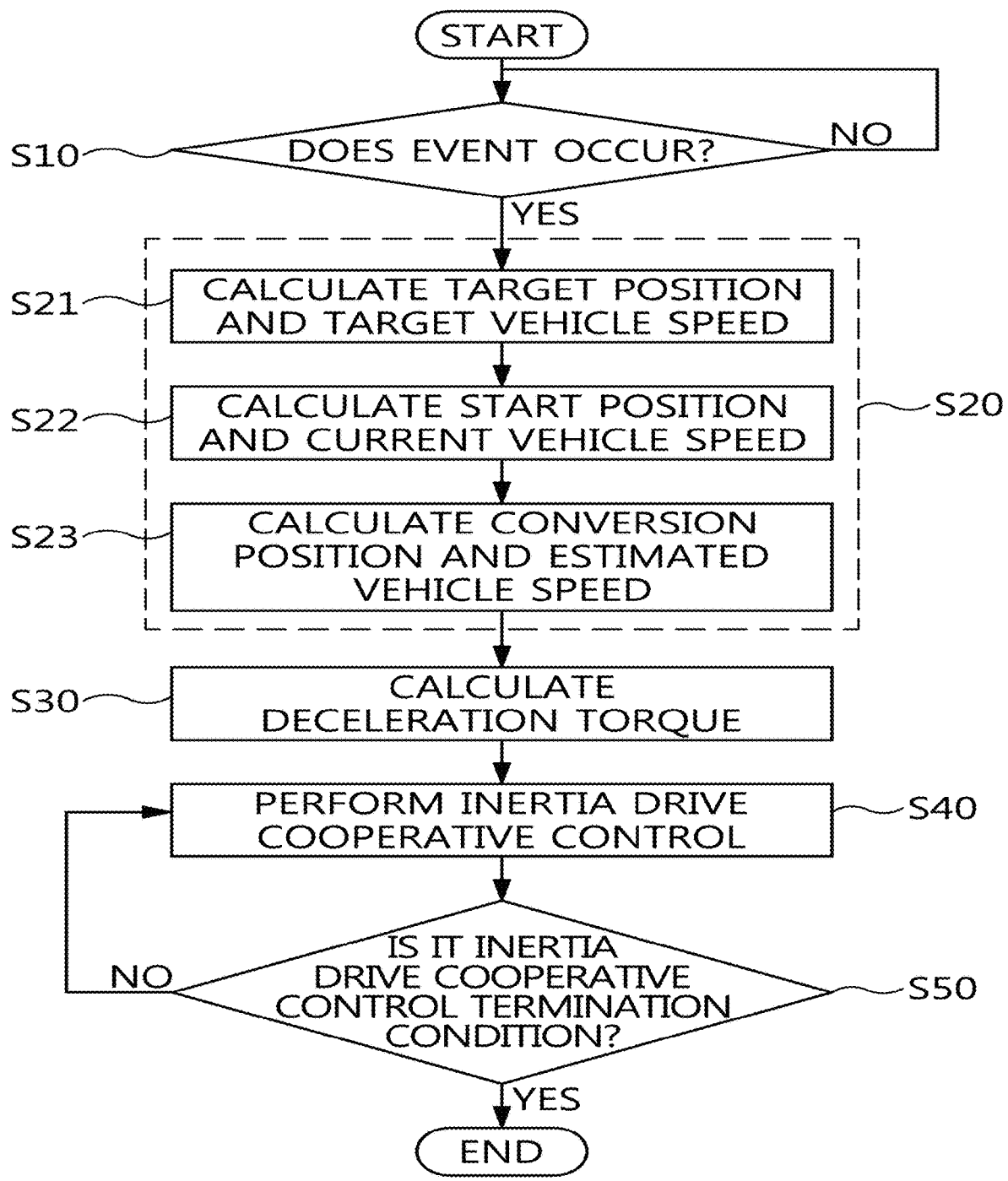
FIG. 1 is a flowchart of a method for inertia drive control with a torque sharing according to an exemplary embodiment of the present disclosure.

Exemplary embodiments of the present disclosure will be described below in more detail with reference to the accompanying drawings, and these embodiments are examples of the present disclosure and may be embodied in different forms by those skilled in the art to which the present disclosure pertains, so that the present disclosure is not limited to these embodiments.

For reference, an inertia drive variable, an event, a target vehicle speed, and an inertia drive, which are applied to inertia drive control, are defined as follows.

The inertia drive variable may be basically calculated on the basis of a start position, a conversion position, a target position, a current vehicle speed, a controlled vehicle speed, an estimated vehicle speed, and a target vehicle speed and may be further calculated according to conditions on the basis of deceleration energy, a deceleration torque, a motor torque, and a hydraulic braking torque, or the inertia drive variable may be set as a set value or may be derived as a result of a mapping process for a condition value. However, the calculation, the set value, or the mapping process result is varied through optimization according to driving conditions and specifications of a vehicle and each device, and thus this is not limited to a specific value.

The event (or a deceleration event or a deceleration event situation) means a place that is located ahead of a vehicle and is required for deceleration of the vehicle at a road on which the vehicle is driving.

The target vehicle speed is a predetermined value for each event. For example, the target vehicle speed may be a regulation speed which is set according to a road condition such as an inclined ground or a flat ground, a speed limit of a speed limit road where a speed limit is required, a regulation speed at an intersection, and a regulation speed which is set according to a road curvature of a curved road.

The inertia drive means that a vehicle is driving due to inertia in a state in which an engine clutch is opened or released and both an accelerator pedal and a brake pedal are off by a driver. Therefore, the inertia drive may include coasting in which the vehicle is driven due to only inertia of the vehicle on a downhill road, but the inertia drive should be understood in a broader sense compared to the coasting.

Limitation of conventional inertia drive control as contrasting with the inertia drive control with a torque sharing according to the present disclosure can be clearly understood as follows.

The conventional inertia drive control cannot implement vehicle deceleration, and moreover, utilization of a motor is made with an actual motor deceleration torque that is less than an available motor deceleration torque, such that the vehicle deceleration is inevitably limited to coverage of the motor. Particularly, since the conventional inertia drive control does not use hydraulic braking and thus the motor cannot manage to perform the inertia drive control when required inertia drive power is high, an inertia drive is limited such that restoration of regenerative energy is inevitable limited.

Further, since the conventional inertia drive control uses only the motor, maximum available motor performance and a vehicle state limiting condition (e.g., a motor specification and generation of a bms signal) inevitably act as limiting conditions of the motor for the inertia drive control, and the limiting conditions inevitably act as limitation on functions of the inertia drive control, such as limitation on an inertia drive guidance function and an inertia drive guidance display.

For example, the limitation on the inertia drive guiding function is control of limiting the inertia drive guiding function when a speed camera is encountered, and this is because police enforcement causes when the overspeed camera is encountered and a vehicle speed is not converged on a target speed according to an inertia drive target profile using the motor in alone.

For example, the limitation on the inertia drive guidance display is control of limiting a battery full charging, a battery charging limitation, a motor charging limitation, a downhill road, a difference between a current vehicle speed and a target vehicle speed, and proximity to a target position, which are required to determine whether the inertia drive control is available, and this is because the battery full charging is a condition in which a battery charging is impossible, the battery charging limitation is a condition of a temperature, a voltage, or a current of a battery, which makes motor deceleration impossible, the motor charging limitation is a condition in which motor deceleration is impossible, the downhill road is a condition in which the downhill road is severe and thus deceleration is impossible by the motor, the difference between the current vehicle speed and the target vehicle speed is a condition in which a vehicle speed difference is large and thus deceleration is impossible by the motor, and the proximity to the target position is a deceleration condition in which deceleration is insufficient by the motor in alone.

Accordingly, the method for inertia drive control with a torque sharing of FIG. 1 is proposed to resolve the above-described problems of the conventional inertia drive control.

Referring to FIG. 1, the method for inertia drive control with a torque sharing is implemented by detecting occurrence of an event while a vehicle is driving (S10), calculating an inertia drive variable required for inertia drive control (S20), calculating a deceleration torque for vehicle deceleration (S30), performing inertia drive cooperative control (S40), and applying an inertia drive cooperative control termination condition to terminate or suspend the inertia drive control (S50).

Therefore, the method for inertia drive control with a torque sharing has a main feature of the performing of the inertia drive cooperative control (S40), and the performing of the inertia drive cooperative control (S40) includes performing vehicle deceleration with a vehicle deceleration torque and a hydraulic braking torque. Particularly, a maximum allowable value of the motor is applied as the motor deceleration torque, and the hydraulic braking torque manages an insufficient portion of the vehicle deceleration even with the maximum allowable value of the motor.

Consequently, the method for inertia drive control with a torque sharing overcomes the limitation of the conventional inertia drive control using only the motor in alone, improves reliability of the driver on the basis of ease and accuracy in control of a hydraulic pressure of a braking system, and resolves the limiting conditions of the inertia drive control, such that an inertia drive control area extends to bring an effect of fuel efficiency improvement. Particularly, in the method for inertia drive control with a torque sharing, the extension of the inertia drive control area according to the limiting conditions of the inertia drive control may also have usability suitable for infrastructure technology which is required for the autonomous vehicle.

Therefore, the method for inertia drive control with a torque sharing is applied to vehicles which use a motor as a vehicle drive source and are capable of controlling a regeneration mode and deceleration by a motor during an inertia drive. Such vehicles are represented by eco-friendly vehicles such as pure electric vehicles, hybrid vehicles, fuel cell electric vehicles, and the like. Particularly, the hybrid vehicles include not only general hybrid electric vehicles (HEVs) but also plug-in HEVs (PHEVs).

Figure 2:
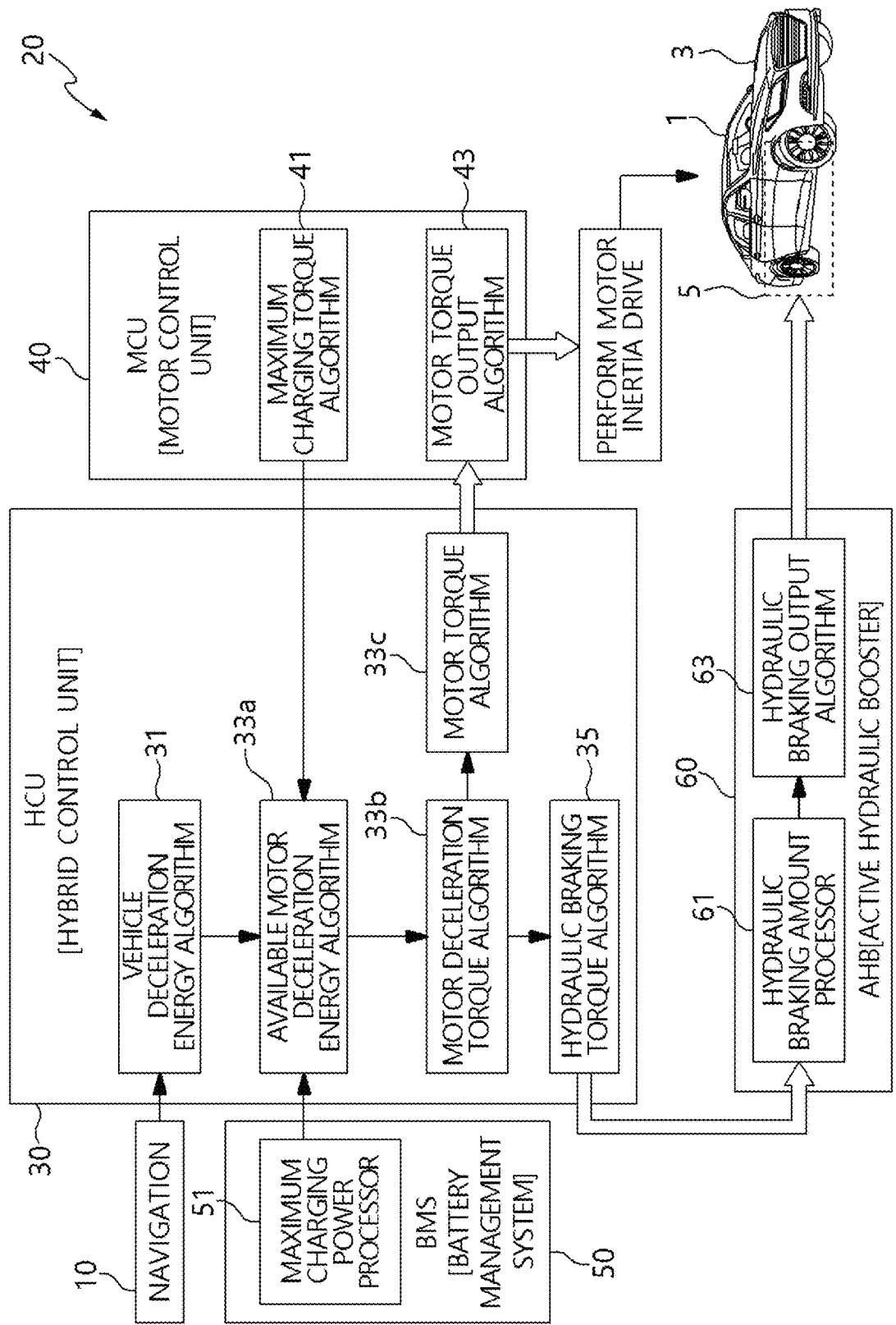
FIG. 2 is an example of an eco-friendly vehicle in which inertia drive control with a torque sharing is implemented with inertia drive cooperative control according to an exemplary embodiment of the present disclosure.

Referring to FIG. 2, an eco-friendly vehicle 1 includes a motor 3 serving as a power source, a braking system 5, a global positioning system (GPS) navigation device or simply GPS 10, and a controller 20.

Particularly, the motor 3 is a power source of the eco-friendly vehicle 1 and is operated in conjunction with a motor control unit (MCU) 40. The braking system 5 includes an integrated brake assist unit (IBAU), controls wheels of the eco-friendly vehicle 1 by a braking hydraulic pressure according to a manipulation of a brake pedal, and operates in conjunction with an active hydraulic booster (AHB) 60. The brake pedal is stepped on and manipulated by a driver so as to allow a braking hydraulic pressure in a hydraulic cylinder to be generated, is provided with a brake lamp switch (BLS) for notifying a brake manipulation to the outside and a brake pedal stroke (BPS) sensor for detecting a pedal stroke, and is configured to provide a hybrid control unit (HCU) 30 with a signal according to the brake manipulation. Therefore, the motor 3 and the braking system 5 are general components of the eco-friendly vehicle 1.

Particularly, the GPS 10 guides a vehicle driving using road topography information in which a limited vehicle speed for each road, a topographic change of an interchange (IC), a junction (JC), and a tollgate, and a vehicle driving change of a left or right turning are classified into events, and a driving route setting is made on the GPS 10. Therefore, the GPS 10 is the same as a general GPS installed at a vehicle, but there is a difference in that the GPS 10 is in conjunction with the controller 20 for inertia driving control.

Particularly, the controller 20 may include the HCU 30, the MCU 40, a battery management system (BMS) 50, and the AHB 60. Therefore, the controller 20 has a main feature of performing the inertia drive cooperative control through operations of the motor 3 and a brake in cooperation with the braking system 5, and the controller 20 performs overall vehicle control including all operations of starting the inertia drive control, sharing a torque, and terminating the inertia drive control.

For example, the HCU 30 includes a vehicle deceleration energy calculator 31 for operating as a higher level controller configured to control driving of the eco-friendly vehicle 1 and for calculating a deceleration torque required between a target position and a start position/conversion position/target position/target vehicle speed/conversion position, an available motor deceleration energy algorithm 33 for calculating a motor contribution to the inertia drive control from motor charging limit power, an available motor deceleration torque, a motor deceleration torque, and an actual motor torque in conjunction with the GPS 10 and configured with an available motor deceleration energy algorithm 33a, a motor deceleration torque algorithm 33b, and a motor torque algorithm 33c, and a hydraulic braking torque algorithm 35 for compensating for an insufficient torque of the motor 3 with a hydraulic braking torque of the inertia drive control.

For example, the MCU 40 controls the motor 3 and includes a maximum charging torque algorithm 41 and a motor torque output device algorithm 43 for the inertia drive control in association with the HCU 30. The maximum charging torque algorithm 41 performs a motor charging limitation setting and motor charging limitation cooperative control informing the available motor deceleration energy algorithm 33a of the HCU 30 of the motor charging limitation setting. The motor torque output algorithm 43 outputs a motor torque output to the motor 3 in conjunction with the motor torque algorithm 33c of the HCU 30.

For example, the BMS 50 controls a state of charge (SOC) of a battery and includes a maximum charging power algorithm 51 for torque sharing control in conjunction with the HCU 30. The maximum charging power algorithm 51 performs a battery SOC limitation setting so as to prevent battery overcharging of the HCU 30 and battery charging limitation cooperative control informing the available motor deceleration energy algorithm 33a of the HCU 30 of the battery SOC limitation setting.

For example, the AHB 60 includes a hydraulic braking amount algorithm 61 and a hydraulic braking output algorithm 63 so as to control the braking system 5 according to a manipulation of the brake pedal 7 and for the inertia drive control in conjunction with the HCU 30. The hydraulic braking amount processor 61 determines a hydraulic braking amount on the basis of an amount that the motor 3 cannot manage when the inertia drive calculated as the hydraulic braking torque is guided in conjunction with the hydraulic braking torque algorithm 35. The hydraulic braking output algorithm 63 outputs a hydraulic braking output to the braking system 5 according to the determined hydraulic braking amount.

Further, the eco-friendly vehicle 1 includes pieces of three-dimensional (3D) map data stored in a data storage of the controller 20. Therefore, the controller 20 recognizes a current vehicle position and an event ahead of the vehicle using the pieces of 3D map data and global positioning system (GPS) information received via a GPS receiver during driving, and the controller 20 guides the driver with an optimal point of time at which the accelerator pedal should be off through an information provider (e.g., an indicator on a cluster or an in-vehicle display) during the inertia drive control. The pieces of 3D map data may be 3D geographical information, i.e., pieces of high-precision map data capable of providing 3D road information including altitude information on a two-dimensional (2D) plane, and the pieces of 3D map data may provide event position and target regulation vehicle speed information, and road inclination information from a current vehicle position to a target event position. To this end, the pieces of 3D map data may be a map database of an advanced driver assistance system (ADAS) installed at the vehicle in advance, and position information of each event requiring deceleration, target regulation vehicle speed information of each event, inclination information of surrounding roads, and the like may be used by being inputted and stored in a 3D map database of the ADAS.

Hereinafter, each of the detecting of the occurrence of the event (S10), the calculating of the inertia drive variable (S20), the calculating of the deceleration torque (S30), the performing of the inertia drive cooperative control (S40), and the applying of the inertia drive cooperative control termination condition (S50) will be described in detail with reference to FIGS. 2 to 5.

As shown in FIG. 2, a control main body of the inertia drive control is the controller 20 which includes the HCU 30, the MCU 40, the BMS 50, and the AHB 60, and control targets of the inertia drive control are the motor 3 and the braking system 5.

Particularly, the detecting of the occurrence of the event (S10) by the controller 20 is performed in cooperation with the HCU 30.

Referring to 2, the controller 20 detects occurrence of an event from an event of the GPS 10 in cooperation with the HCU 30 (S10), and the event is information including a limited vehicle speed, an IC, a JC, a tollgate, a left or right turning, and the like. Therefore, the detecting of the occurrence of the event (S10) may be performed when the eco-friendly vehicle 1 is driving on a speed limit road, an intersection, a curve road, an IC, a JC, a place where a traffic light or a tollgate is located, a position where a U-turn, a left turn, or right turn should be performed on a driving route to a destination which is set on the GPS 10, or a destination where the eco-friendly vehicle 1 should stop. However, the foregoing is illustrative, and the present disclosure is not limited thereto, and all places where a target vehicle speed is fixed and vehicle deceleration is required may be included in the events.

Particularly, the calculating of the inertia drive variable (S20) includes calculating an inertia drive variable which includes a distance variable for a vehicle position and a speed variable for a vehicle speed, and the distance variable and the speed variable are the same as those applied to the conventional inertia drive control.

Referring to FIG. 2, a driving route is set to the GPS 10 by a driver, and the GPS 10 generates event information, road inclination information, and current vehicle position information, which are present on the driving route. Then, the controller 20 may acquire the current vehicle position information, position information of an event ahead of the eco-friendly vehicle 1, target regulation vehicle speed information at the event using the pieces of map data stored in the storage (not shown) and GPS information received via the GPS receiver (not shown).

In this case, the pieces of map data are pieces of 3D map data, and the pieces of 3D map data may be a map database of ADAS in which position information of each event requiring deceleration, target regulation vehicle speed information of each event, inclination information of surrounding roads of each event, and the like are input and stored.

Therefore, the controller 20 operates as a control main body performing the calculating of the inertia drive variable (S20).

Figure 3:
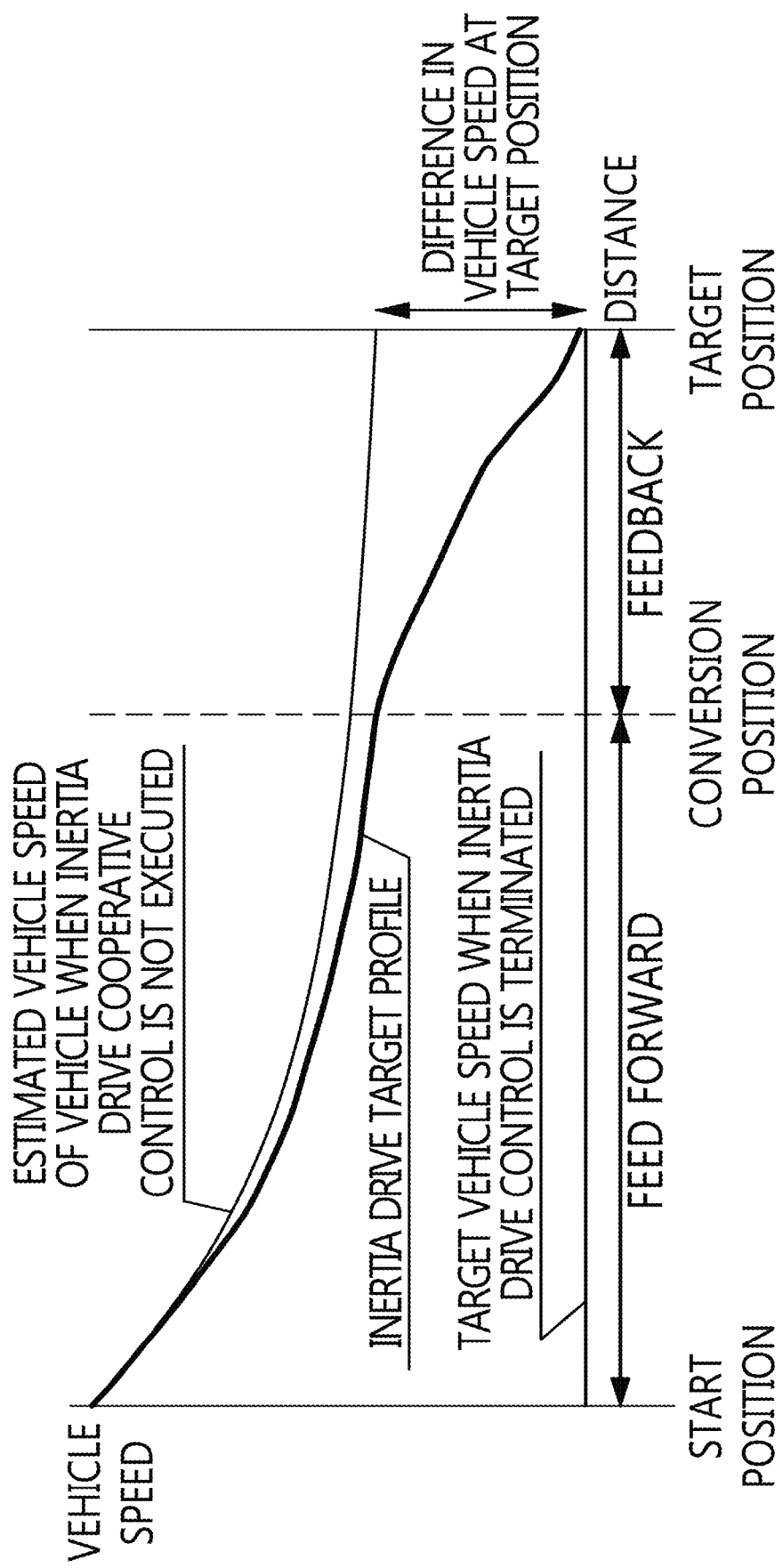
FIG. 3 is a graph exemplifying a target position vehicle speed difference between an inertia drive target profile and an estimated vehicle speed of a vehicle at a time when cooperative control is not executed according to an exemplary embodiment of the present disclosure.

Referring to FIG. 3, a start position, a conversion position, a target position, an estimated vehicle speed, and a target vehicle speed for the inertia drive control are classified according to an inertia drive target profile. Further, when the eco-friendly vehicle 1 is decelerated to an estimated vehicle speed and is arrived at a target position of an event, a target position vehicle speed difference means a difference between the inertia drive target profile and the estimated vehicle speed of the eco-friendly vehicle 1 when the inertia drive cooperative control is not executed. FIG. 3 shows the same concepts as the start position, the conversion position, the target position, the estimated vehicle speed, the target vehicle speed, and the inertia drive target profile applied to the conventional inertia drive control. Accordingly, the target vehicle speed is clearly defined as an inertia drive control termination target vehicle speed. Further, feedforward control is commenced when the driver checking an inertia driving guidance releases a driver's foot from the accelerator pedal at a start position and is maintained until a conversion position, and feedback control is commenced when arriving at the conversion position and is maintained until a target position. Particularly, during the feedforward control and the feedback control, a negative torque for which battery charging is carried out under the control of the controller 20 for deceleration of the eco-friendly vehicle 1 is applied to the motor 3.

Therefore, the calculating of the inertia drive variable (S20) includes calculating a target position and a target vehicle speed (S21), calculating a start position and a current vehicle speed (S22), and calculating a conversion position and an estimated vehicle speed (S23).

In the calculating of the target position and the target vehicle speed (S21), the target position which is a distance variable and the target vehicle speed which is a speed variable are calculated.

For example, the target position is determined as a position spaced 0 m from the GPS 10, and the target vehicle speed is determined by kinds of events, which is classified into an IC, a JC, a tollgate, and a left or right turning, and a mapping of a limited vehicle speed according to the kinds of events, such the inertia drive control is terminated at the target position.

Particularly, when the target vehicle speed for the termination of the inertia drive control is determined, a target vehicle speed of the conventional inertia drive control, such as "a target vehicle speed in consideration of a road inclination," may be applied. The target vehicle speed in consideration of a road inclination is determined by applying road inclination information from a current position to the target position of the eco-friendly vehicle 1, and the target vehicle speed is calculated by multiply a target regulation vehicle speed by an inclination factor, such as "target regulation vehicle speed×inclination factor (a value obtained by considering an average inclination of a road with respect to the target regulation vehicle speed). The inclination factor is provided in the form of an inclination factor table (or map), and the inclination factor table (or map) is prepared using information acquired during a pre-test procedure.

Further, in the calculating of the start position and the current vehicle speed (S22), the start position which is a distance variable and the current vehicle speed which is a speed variable are calculated.

For example, the start position is calculated and determined as a (set value) which is a distance from the target position, and the current vehicle speed is determined as a vehicle speed at a point of time when the eco-friendly vehicle 1 passes the start position.

Particularly, the start position set to the distance from the target position means a position where the driver should be off the accelerator pedal so as to start the inertia drive and, at the same time, the inertia drive guidance function is operated. From the foregoing, the arrival at the start position means that the information provider (not shown) is operated to check an operation of the inertia drive caused by the driver and to induce the driver to release the driver's foot from the accelerator pedal. The inertia drive guidance for the driver may be made by utilizing visual or auditory recognition part including an indicator on a cluster, a display device of an audio, video, and navigation (AVN) device, and a head-up display (HUD).

Further, in the calculating of the conversion position and the estimated vehicle speed (S23), the conversion position which is a distance variable and the estimated vehicle speed which is a speed variable are calculated.

For example, the conversion position is a position where the feedforward control is converted into the feedback control, and the conversion position is determined by applying the mapping and the target vehicle speed. The estimated vehicle speed is determined as a vehicle speed, which is estimated at the conversion position when the eco-friendly vehicle 1 is driving with an inertia drive at the start position according to the inertia drive target profile, on the basis of factors including a distance between the start position and the conversion position, a current vehicle speed at the start position, driving resistance, and a difference in altitude between the start position and the conversion position.

Particularly, the conversion position may be a remaining distance which is determined using pieces of set data (different tables (or maps) according to countries or regions) from the target vehicle speed and the event information (the IC, the JC, the intersection, and the like), such as "distance between start position and target position—remaining distance (a distance from the target position to the conversion position)."

Further, the estimated vehicle speed may be calculated as a value compensated by an offset (a value obtained for each position from the current position to the target position) which is calculated using an estimated flat ground vehicle speed (input and stored values) at the current vehicle speed of the eco-friendly vehicle 1, a load torque according to a road inclination, and creep torque information according to the vehicle speed, such as "estimated flat ground vehicle speed+offset." The offset may be defined as "[(coast down (C/D) value of vehicle (input and stored vehicle eigenvalue corresponding to driving resistance)×tire dynamic radius (input and stored vehicle eigenvalue)×F1 (input and stored factor value)+(load torque×F2 (input and stored factor value)+(creep torque (torque generated by motor)×power train efficiency) (input and stored vehicle eigenvalue)]."

Specifically, in the calculating of the deceleration torque (S30), a motor deceleration torque and a hydraulic braking torque are respectively calculated from required deceleration energy of the eco-friendly vehicle 1 from the conversion position to the target position. At this point, the motor deceleration torque is an area in which motor utilization is maximized to reduce the deceleration energy of the eco-friendly vehicle 1 with an inertia drive without a driver intervention, and the hydraulic braking torque is an area in which hydraulic braking is performed to reduce the deceleration energy of the eco-friendly vehicle 1, which cannot be managed by the maximum motor utilization.

Referring to FIG. 2, the controller 20 uses the HCU 30, and the HCU 30 calculates the motor deceleration torque and the hydraulic braking torque through the vehicle deceleration energy algorithm 31, the available motor deceleration energy algorithm 33*a*, the motor deceleration torque algorithm 33*b*, the motor torque algorithm 33*c*, and the hydraulic braking torque algorithm 35.

Figure 4:
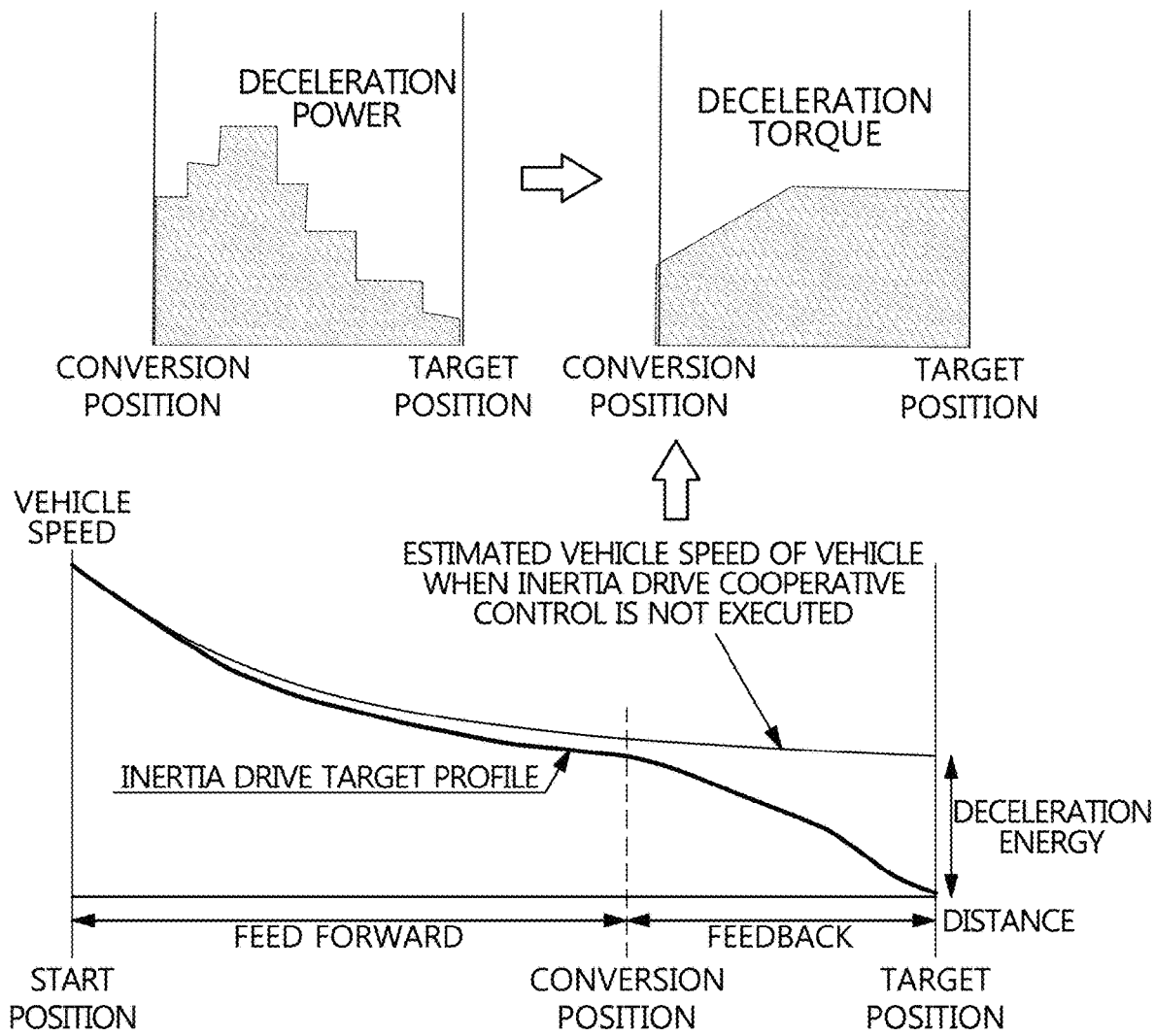
FIG. 4 is a diagram illustrating an example of converting deceleration energy of a vehicle, which is required to reach a target position of an inertia drive target profile, into a deceleration torque of the vehicle according to an exemplary embodiment of the present disclosure.

Referring to FIG. 4, during the inertia drive of the eco-friendly vehicle 1, deceleration energy required to reach the target position from the conversion position is exemplified as a difference between the inertia drive target profile and the estimated vehicle speed of the eco-friendly vehicle 1 when the inertia drive cooperative control is not executed.

Referring to FIGS. 2 and 4, the calculating of the deceleration torque (S30) may be performed as follows.

As shown in FIG. 2, in order to calculate the deceleration energy, the vehicle deceleration energy algorithm 31 of the HCU 30 considers an estimated vehicle speed at the target position (an estimated vehicle speed of the eco-friendly vehicle 1 when the inertia drive cooperative control is not executed), the current vehicle speed at the conversion position, a controlled vehicle speed at the target position (an anticipated vehicle speed according to the inertia drive target profile, which is set to a different value according to a mapping intent by a developer), and the current vehicle speed at the conversion position. From the foregoing, the controlled vehicle speed is calculated according to the inertia drive target profile, a time from the conversion position to the target position is calculated from the current vehicle speed, the target vehicle speed, and a distance between the conversion position and the target position, and thus the deceleration energy for the inertia drive can be calculated according to the inertia drive target profile.

Then, the deceleration energy is converted into deceleration power, and the deceleration power is calculated by dividing the deceleration energy into required power of a predetermined unit between the conversion position and the target position. In this case, the predetermined unit may be 100 ms, but the present disclosure is not limited to a specific value. Thereafter, the deceleration power is converted into a deceleration torque, and the deceleration torque is calculated as the controlled vehicle speed according to the inertia drive target profile with respect to the deceleration power.

As described above, the deceleration energy is calculated as the deceleration torque via the deceleration power so as to be applied to the calculation of the motor deceleration torque and the hydraulic braking torque.

Subsequently, the motor deceleration torque and the hydraulic braking torque are calculated as follows.

Figure 5:
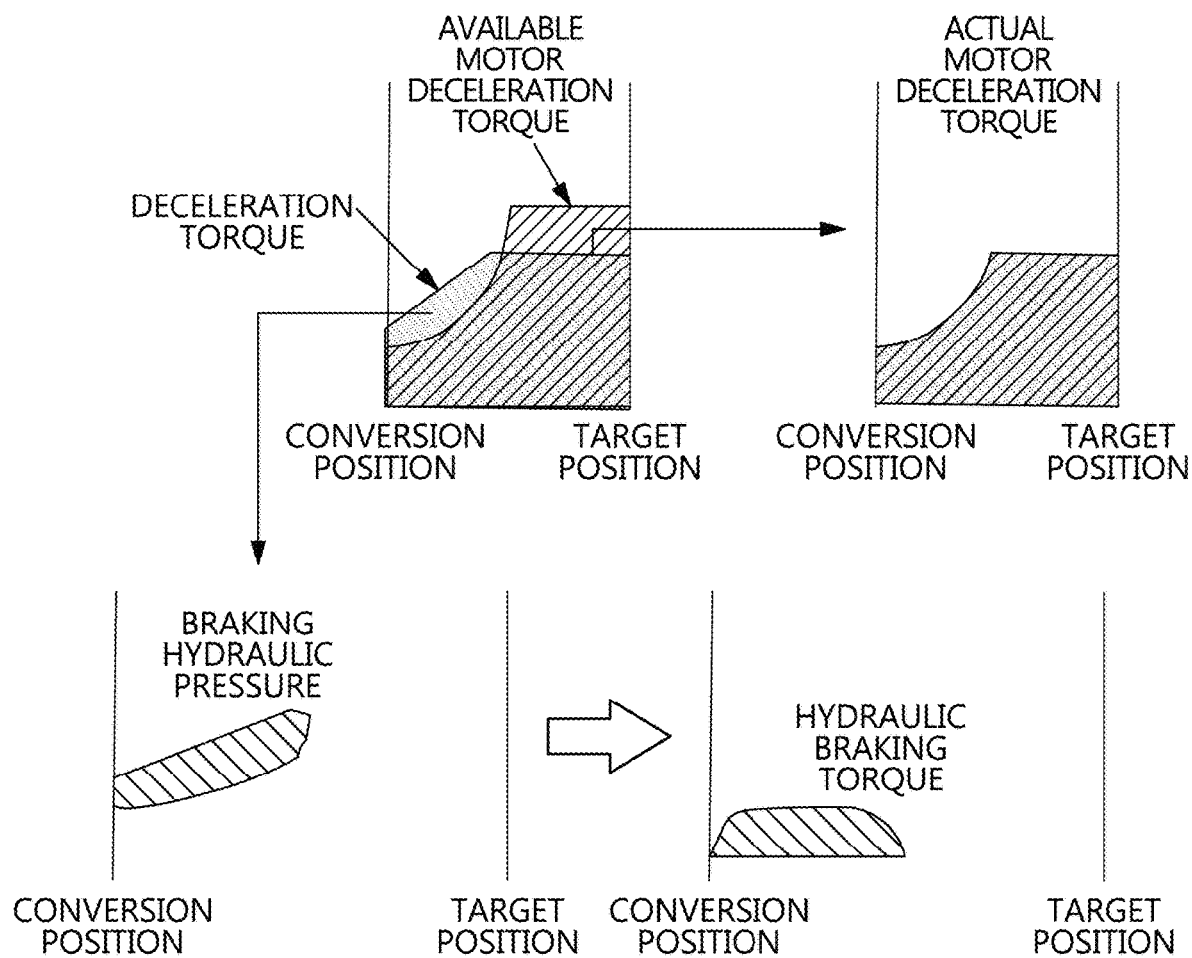
FIG. 5 is a diagram illustrating an example in which a hydraulic braking torque and a deceleration torque of a motor, which are required to reach a target position, are calculated through inertia drive cooperative control according to an exemplary embodiment of the present disclosure.

FIG. 5 exemplifies that an available motor torque of the motor 3 is calculated as an actual motor torque by being mapped to the deceleration torque of the deceleration energy, and at the same time, the hydraulic braking torque is calculated as deceleration torque that cannot be managed by the available motor torque.

As shown in FIG. 2, the available motor torque of the motor 3 is calculated by the available motor deceleration energy algorithm 33*a* of the HCU 30 in conjunction with the maximum charging torque algorithm 41 of the MCU 40 and the maximum charging power algorithm 51 of the BMS 50.

For example, the available motor deceleration energy algorithm 33*a* sets a motor charging limitation in conjunction with the maximum charging torque algorithm 41 through the motor cooperative control, and a battery charging limitation of an state of charge (SOC) of a battery in conjunction with the maximum charging power algorithm 51 through the battery cooperative control so as to prevent overcharging of the battery, and the available motor deceleration energy algorithm 33*a* calculates the available motor torque from the battery charging limitation and the motor charging limitation.

Then, the motor deceleration torque algorithm 33*b* and the motor torque algorithm 33*c* of the HCU 30 calculate maximum motor power to determine a chargeable motor torque for each vehicle speed, calculate the chargeable motor torque as an available motor deceleration torque, and calculate the actual motor deceleration torque by mapping the available motor deceleration torque and the deceleration torque.

Consequently, the actual motor deceleration torque has a minimum value of the deceleration torque and the available motor deceleration torque and is determined as a main role of the motor 3 for the inertia drive control.

Further, as shown in FIG. 2, the hydraulic braking torque is calculated in the hydraulic braking torque algorithm 35 of the HCU 30 by receiving the result of the motor deceleration torque algorithm 33*b*.

For example, the hydraulic braking torque algorithm 35 checks a portion of the deceleration torque, which is not managed by the actual motor deceleration torque, and calculates the portion as a hydraulic braking torque through a braking hydraulic pressure.

Consequently, the hydraulic braking torque is determined as an auxiliary role of the motor 3 for the inertia drive control.

Particularly, the performing of the inertia drive cooperative control (S40) is a state in which the inertia drive control of the motor 3 through the actual motor deceleration torque is performed as the inertia drive cooperative control through the hydraulic braking torque.

Referring to FIG. 2, the motor torque output algorithm 43 of the MCU 40 generates an output delivered to the motor 3 from the actual torque deceleration torque of the motor torque algorithm 33*c* of the HCU 30. Simultaneously, the hydraulic braking amount processor 61 of the AHB 60 calculates a hydraulic braking amount from the hydraulic braking torque of the hydraulic braking torque algorithm 35 of the HCU 30, and then the hydraulic braking output algorithm 63 of the AHB 60 generates an output delivered to the braking system 5.

Consequently, the inertia drive control of the eco-friendly vehicle 1 performs the inertia drive cooperative control in cooperation with simultaneous operations of the motor 3 and the braking system 5. Particularly, the above-described inertia drive cooperative control mainly performs the inertia drive control of the braking system 5 under an initial condition in which the purpose of the inertia drive cooperative control is difficult to be achieved by only the inertia drive control of the motor 3, and when the purpose of the inertia drive cooperative control is achieved by only the inertia drive control of the motor 3, the inertia drive cooperative control immediately stops the inertia drive control of the braking system 5.

Therefore, the inertia drive cooperative control may maintain high efficiency of the inertia drive control by minimally utilizing the inertia drive control of the braking system 5 in a state of maximally utilizing the inertia drive control of the motor 3.

Specifically, the applying of the inertia drive cooperative control termination condition (S50) means that, when one of various conditions terminating or stopping the inertia drive cooperative control is detected, the vehicle driving is controlled through the detected condition instead of the inertia drive cooperative control. In this case, a type of the termination condition of the inertia drive cooperative control may include a target position arrival condition of the eco-friendly vehicle 1, in which the inertia drive cooperative control is normally terminated, and a release condition in which the inertia drive cooperative control should be immediately interrupted. In this case, the release condition is applied to a low friction condition of the eco-friendly vehicle 1 or is applied so as to immediately resolve a vehicle safety problem which may cause degradation in fuel efficiency due to an aggressive use of hydraulic braking of the inertia drive cooperative control when an attitude of the eco-friendly vehicle 1 is unstable.

For example, the target position arrival condition means that the eco-friendly vehicle 1 reaches the target position through the performing of the inertia drive cooperative control (S40), while the release condition means that at least one of wheel lock occurrence of a wheel lock detection signal, an anti-lock brake system (ABS) operation of an ABS controller signal, a brake manipulation of a brake pedal signal (brake pedal stroke) is generated before the eco-friendly vehicle 1 reaches the target position. Therefore, the eco-friendly vehicle 1 may be switched to the termination of the inertia drive control through the target position arrival condition even when the inertia drive cooperative control is executed, and also safety of the eco-friendly vehicle 1 may be secured by quickly managing a situation in which the inertia drive control should be interrupted through the release condition.

Particularly, before the inertia drive control is terminated due to the target position arrival condition, the release condition is applied when at least one of the wheel lock occurrence, the ABS operation, and the brake manipulation is satisfied. Specifically, the release condition allows different stop methods to be applied to the performing of the inertia drive cooperative control (S40) configured with the wheel lock occurrence, the ABS operation, and the brake manipulation. For example, an interruption method for the performing of the inertia drive cooperative control (S40) with respect to the wheel lock occurrence and the ABS operation is to output a motor torque of zero through step control. An interruption method for the performing of the inertia drive cooperative control (S40) with respect to the brake manipulation is to converge a slope of the motor torque to zero through rate control. To this end, the controller 20 sets the wheel lock occurrence and the ABS operation as inertia drive critical conditions to first priorities, and the brake manipulation as an inertia drive subsequent priority release condition to a second priority.

Further, the release condition involves a brake pedal operation of the driver together with the interruption of the inertia drive cooperative control, so that the release condition controls the driving of the eco-friendly vehicle 1 with at least one of control when braking is started, control when regenerative braking is limited, and control when braking is off. In this case, the controller 20 performs cooperative control with the HCU 30, the MCU 40, the BMS 50, the AHB 60, and a transmission control unit (TCU) (not shown) as shown in FIG. 2. Further, the creep torque is generated by the motor 3, and during the inertia drive (or coasting), the creep torque generated due to the motor 3 is generally a negative torque (coast regenerative torque), and thus charging of the battery may be performed by an electric power generation operation of the motor 3 during the generation of the creep torque by the motor 3. Particularly, an applied torque of the motor 3 may be determined as a value obtained by adding an additional torque, which is determined according to the current vehicle position information and the target vehicle speed, to a basic creep torque.

For example, since the control when the braking is started may be performed as regenerative braking control, the motor 3 is controlled to maintain a varied creep torque ratio by applying "creep torque×(varied creep torque at braking start time/existing creep torque at braking start time)." From the foregoing, the motor torque may be reduced while constantly and continuously maintaining a rate the same as a rate at a point of time when the driver stepped on the brake pedal.

Since the control when the regenerative braking is limited may not be performed as the regenerative braking control, the motor 3 is controlled by switching the motor torque to the existing creep torque. At this point, because of the vehicle deceleration state, the basic creep torque is gradually decreased according to the vehicle speed, but in order to prevent a large rate over a predetermined level, a variation of the basic creep torque is controlled to be gentle by limiting a rate of the basic creep torque with a rate limit and a filter.

Further, the control when the braking is off is performed in a case in which a total braking amount is not generated, i.e., the total braking amount=0, due to the release of the brake pedal manipulation by the driver, so that the motor torque is converted into the basic creep torque to control the motor 3. At this point, because of the vehicle deceleration state, the basic creep torque is gradually decreased according to the vehicle speed, but in order to prevent a large rate over a predetermined level, a variation of the basic creep torque is controlled to be gentle by limiting a rate of the basic creep torque with a rate limit and a filter.

As described above, in accordance with the inertia drive control of the eco-friendly vehicle 1 with a torque sharing according to the present embodiment, a controller detects an event requiring deceleration during the eco-friendly vehicle 1 is driving, calculates a target vehicle speed, a current vehicle speed, and an estimated vehicle speed according to the event, divides a deceleration torque for deceleration of the eco-friendly vehicle 1 into a motor torque and a hydraulic braking torque, guides inertia drive control, and performs inertia drive cooperative control in which motor control through a motor torque and braking system control through a hydraulic braking torque are simultaneously started. Consequently, the inertia drive cooperative control improves reliability of a driver with hydraulic pressure control having easiness and accuracy while overcoming limitation on the conventional inertia drive control utilizing a motor in alone and also resolves a limiting condition for the inertia drive control to increase an effect of fuel efficiency improvement.

Further, in accordance with the inertia drive cooperative control according to the present embodiment, simultaneous torque sharing control of a motor and a braking system is possible, such that various modifications in inertia drive control performance of the motor are possible through a hydraulic cooperative method according to hydraulic pressure priority control or a hydraulic contribution method using a predetermined amount of hydraulic braking.

The method for inertia drive control with a torque sharing of the present disclosure can increase a regenerative braking contribution rate of the motor by maximally utilizing the motor through the inertia drive cooperative control of motor control and hydraulic braking control motor control and resolves a limiting condition of the inertia drive control using hydraulic braking managing a portion that cannot be managed by the motor, such that control technology suitable for an autonomous vehicle without a driver intervention can be utilized through an eco-friendly vehicle.

Further, the method for inertia drive control with a torque sharing of the present disclosure implements the following actions and effects.

First, a fuel efficiency improvement effect is due to the fact that resolving of the limiting conditions, which is limited when the inertia drive control using only the motor is performed, is led to extension of an inertia drive control area, such that additional fuel economy improvement of about 3.3% occurs.

Second, control accuracy can be secured because the inertia drive cooperative control is performed with a hydraulic pressure which is easy to control, such that accuracy is not degraded even in a situation of controlling the motor, a battery, or a vehicle speed. Particularly, application of the inertia drive cooperative control overcomes the limitation of securing the control accuracy, which causes various limitation factors on the inertia drive control, such that the inertia drive control can extend to a control area requiring high precision such as an overspeed camera.

Further, an effect of merchantability is improved due to that fact that it is possible to accurately follow a target speed for each event which is expected by the driver, such that reliability felt by the driver is improved to increase the frequency of use. Particularly, the effect of merchantability is improved due to that fact that an inertia drive guidance function is used in a speed camera enforcement section which is best for the driver to feel.

In accordance with the present disclosure, guidance function control of the inertia drive control is performed on the basis of utilization of the hydraulic pressure, and thus, during an inertia drive, the inertia drive control of the present disclosure can be variously modified such as a hydraulic cooperative control method through hydraulic priority control or a hydraulic contribution control method through a predetermined amount of hydraulic braking, thereby enhancing applicability to an eco-friendly vehicle.

What is claimed is:

1. A method for inertia drive control with torque sharing of an eco-friendly vehicle, the method comprising steps of:
   when an event, in which the eco-friendly vehicle being decelerated with the inertia drive control is detected, calculating, by a controller, a distance variable and a speed variable according to the event;
   calculating, by the controller, a deceleration torque, which is required for an inertia drive of the eco-friendly vehicle, by dividing into a motor torque and a hydraulic braking torque; and
   performing, by the controller, inertia drive cooperative control in which the deceleration is performed without driver intervention with motor control through the motor torque and hydraulic braking control through the hydraulic braking torque,
   wherein the step of calculating the deceleration torque includes:
      when the deceleration torque is distributed, determining a maximum value of the motor torque by a motor status; and
      calculating the motor torque as an actual motor deceleration torque which is an intersection area by mapping the deceleration torque and an available motor deceleration torque, and
   wherein the available motor deceleration torque is determined by a chargeable motor torque for each vehicle speed,
   wherein an area outside the intersection area of the deceleration torque is a braking hydraulic pressure, and the braking hydraulic pressure is calculated as the hydraulic braking torque, and
   wherein the hydraulic braking torque is calculated as a portion of the deceleration torque that is not managed by the actual motor deceleration torque, and the hydraulic braking torque is determined as an auxiliary role of a motor for the inertia drive control.

2. The method of claim 1, wherein the distance variable and the speed variable are calculated according to an inertia drive target profile of the eco-friendly vehicle.

3. The method of claim 2, wherein the distance variable includes a start position, a conversion position, and a target position, and
   wherein the start position, the conversion position, and the target position are set in a time-series manner.

4. The method of claim 2, wherein the speed variable includes a current vehicle speed, an estimated vehicle speed, and a target vehicle speed,
   wherein the current vehicle speed is a vehicle speed at a point of time when the eco-friendly vehicle passes the start position of the distance variable, the estimated vehicle speed is a vehicle speed estimated at the conversion position of the distance variable when an inertia drive is performed according to the inertia drive target profile at the start position, and the target vehicle speed is a vehicle speed at a point of time when the eco-friendly vehicle reaches the target position of the distance variable.

5. The method of claim 1, wherein the deceleration torque is determined from deceleration energy of the eco-friendly vehicle,
   wherein the deceleration energy is a magnitude of the deceleration generated between application of the inertia drive target profile of the eco-friendly vehicle and non-application of the inertia drive target profile of the eco-friendly vehicle.

6. The method of claim 5, wherein a conversion between the deceleration torque and the deceleration energy is performed by deceleration power.

7. The method of claim 6, wherein the deceleration power is calculated by dividing an entire section of the deceleration energy by unit time.

8. The method of claim 1, wherein the actual motor deceleration torque is a minimum value of the available motor deceleration torque.

9. The method of claim 1, further comprising, while performing the inertia drive cooperative control, detecting an inertia drive cooperative control termination condition as a target position arrival condition in which the inertia drive cooperative control is terminated and as a release condition in which the inertia drive cooperative control is interrupted.

10. The method of claim 9, wherein, when at least one condition of a wheel lock occurrence, an anti-lock brake system (ABS) operation, and a brake manipulation is satisfied, the release condition interrupts the inertia drive cooperative control.

11. The method of claim 10, wherein the wheel lock occurrence and the ABS operation include an inertia drive critical condition, and
   the brake manipulation includes an inertia drive subsequent priority release condition.

12. The method of claim 11, wherein the inertia drive cooperative control is interrupted by control of the wheel lock occurrence or the ABS operation, which is performed by applying a step output of 0 (zero) to the motor torque, in the inertia drive critical condition.

13. The method of claim 11, wherein the inertia drive cooperative control is interrupted by control of the brake manipulation, which is performed by applying a rate output of a slope to the motor torque, in the inertia drive subsequent priority release condition.

14. The method of claim 9, wherein, in the release condition, vehicle driving is controlled by at least one of control when braking starts according to manipulation of a brake pedal, control when regenerative braking is limited, and control when the braking is off according to a release of the manipulation of the brake pedal.

15. The method of claim 1, wherein the controller includes a hybrid control unit (HCU) in conjunction with a GPS and a battery management system (BMS), and the HCU is in conjunction with a motor control unit (MCU) configured to control a motor and an active hydraulic booster (AHB) configured to control a braking system.

16. The method of claim 15, wherein the HCU includes:
a vehicle deceleration energy algorithm performed to calculate deceleration energy of the eco-friendly vehicle for the deceleration torque;
an available motor deceleration energy algorithm performed to calculate the motor torque; and
a hydraulic braking torque algorithm performed to calculate the hydraulic braking torque.

17. The method of claim 16, wherein the available motor deceleration energy algorithm includes:
an available motor deceleration energy algorithm performed to calculate an available motor deceleration torque;
a motor deceleration torque algorithm performed to calculate the intersection area by mapping the available motor deceleration torque with the deceleration torque; and
a motor torque algorithm performed to calculate the motor torque using the intersection area as the actual motor deceleration torque.

* * * * *